(12) United States Patent
Chen

(10) Patent No.: US 11,216,134 B2
(45) Date of Patent: Jan. 4, 2022

(54) PRESSURE SENSING TOUCH SCREEN AND INPUT DEVICE HAVING THE SAME

(71) Applicant: WUHAN CHINA STAR OPTOELECTRONICS SEMICONDUCTOR DISPLAY TECHNOLOGY CO., LTD., Hubei (CN)

(72) Inventor: Bi Chen, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 259 days.

(21) Appl. No.: 16/612,311

(22) PCT Filed: Jul. 8, 2019

(86) PCT No.: PCT/CN2019/094970
§ 371 (c)(1),
(2) Date: Nov. 8, 2019

(87) PCT Pub. No.: WO2020/228116
PCT Pub. Date: Nov. 19, 2020

(65) Prior Publication Data
US 2021/0342036 A1 Nov. 4, 2021

(30) Foreign Application Priority Data
May 14, 2019 (CN) .......................... 201910398290.2

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 2203/04105* (2013.01)

(58) Field of Classification Search
None
See application file for complete search history.

(56) References Cited

U.S. PATENT DOCUMENTS

| 2015/0077380 A1 | 3/2015 | Hayashi et al. |
| 2015/0363019 A1* | 12/2015 | Schediwy ............. G06F 3/0445 345/174 |
| 2018/0107322 A1 | 4/2018 | Liu et al. |
| 2019/0043928 A1* | 2/2019 | Hong .................. H01L 27/3276 |
| 2019/0361569 A1 | 11/2019 | Guo et al. |

FOREIGN PATENT DOCUMENTS

| CN | 105807991 A | 7/2016 |
| CN | 107491215 A | 12/2017 |
| CN | 108693994 A | 10/2018 |
| CN | 109669571 A | 4/2019 |

\* cited by examiner

*Primary Examiner* — Duane N Taylor, Jr.

(57) ABSTRACT

The present invention provides a pressure sensing touch screen and an input device having the same. The pressure sensing touch screen includes a display panel, a pressure sensing layer, and a touch sensing layer. The display panel includes multiple pixels. The pressure sensing layer is placed on the display panel and arranged corresponding to a gap region between the pixels. The touch sensing layer is arranged on the pressure sensing layer. A first insulating layer is interposed between the touch sensing layer and the pressure sensing layer.

18 Claims, 3 Drawing Sheets

PRESSURE SENSING TOUCH SCREEN AND INPUT DEVICE HAVING THE SAME

1. FIELD OF DISCLOSURE

The present invention relates to a field of display devices and in particular, to a pressure sensing touch screen and an input device having the same.

2. DESCRIPTION OF RELATED ART

With development of technology, touch screens are extensively used in electronic products such as mobile phones and play an important role in our daily life. The touch screen is provided with a pressure sensing function to recognize the pressure of a finger on the touch screen, which facilitates human-computer interaction. In some conventional techniques, a pressure sensing device is usually an add-on type device and placed on the back of a display device; however, such configuration increases a thickness of the overall product, causing the product to be heavy and thick.

In some conventional techniques, a pressure sensing device is usually an add-on type device and placed on the back of a display device; however, such configuration increases a thickness of the overall product, causing the product to be heavy and thick.

SUMMARY

It is an objective of the present invention to provide a pressure sensing touch screen and an input device having the same, which integrates a pressure sensing layer, a touch sensing layer, and a display panel into an integral form to realize a lighter and thinner touch device.

Accordingly, the present invention provides a pressure sensing touch screen which comprises a display panel, a pressure sensing layer, and a touch sensing layer. The display panel comprises a plurality of pixels. The pressure sensing layer is disposed on the display panel and arranged corresponding to a gap region between the pixels. The touch sensing layer is disposed on the pressure sensing layer. A first insulating layer is interposed between the pressure sensing layer and the touch sensing layer. The pressure sensing layer comprises at least one pressure sensing grid, and the at least one pressure sensing grid is disposed corresponding to the gap region between the pixels.

According to one embodiment of the present invention, the pressure sensing touch screen further comprises a pressure sensing control circuit electrically connected to the at least one pressure sensing grid via at least one first lead.

According to one embodiment of the present invention, the touch sensing layer comprises a plurality of sensing electrodes arranged along a first direction and a plurality of driving electrodes arranged along a second direction, and each of the sensing electrodes and a corresponding one of the driving electrodes together form a mutual capacitive touch control sensing capacitance.

According to one embodiment of the present invention, the touch sensing layer is disposed corresponding to a gap region between the pixels, and the sensing electrodes and the driving electrodes are disposed corresponding to a gap region between the pixels.

According to one embodiment of the present invention, the pressure sensing touch screen further comprises a touch control circuit electrically connected to the sensing electrodes and the driving electrodes via at least one second lead.

According to one embodiment of the present invention, a width of the touch sensing layer disposed corresponding to the gap region between the pixels is less than a width of the pressure sensing layer disposed corresponding to the gap region between the pixels.

According to one embodiment of the present invention, the pressure sensing layer is made of an opaque piezoelectric material, and the opaque piezoelectric material comprises an opaque composite polymer material and an opaque metal material.

According to one embodiment of the present invention, the touch sensing layer is made of a light-transmissive electrically-conductive material or an opaque electrically-conductive material.

The present invention provides a pressure sensing touch screen, comprising a display panel, a pressure sensing layer, and a touch sensing layer. The display panel comprises a plurality of pixels. The pressure sensing layer is disposed on the display panel and arranged corresponding to a gap region between the pixels. The touch sensing layer is disposed on the pressure sensing layer. A first insulating layer is interposed between the pressure sensing layer and the touch sensing layer.

According to one embodiment of the present invention, the pressure sensing layer comprises at least one pressure sensing grid, and the at least one pressure sensing grid is disposed corresponding to the gap region between the pixels.

According to one embodiment of the present invention, the pressure sensing touch screen further comprises a pressure sensing control circuit. The pressure sensing control circuit is electrically connected to the at least one pressure sensing grid via at least one first lead.

According to one embodiment of the present invention, the touch sensing layer comprises a plurality of sensing electrodes arranged in a first direction and a plurality of driving electrodes arranged in a second direction, and each of the sensing electrodes and a corresponding one of the driving electrodes together form a mutual capacitive touch control sensing capacitance.

According to one embodiment of the present invention, the touch sensing layer is disposed corresponding to a gap region between the pixels, and the sensing electrodes and the driving electrodes are disposed corresponding to a gap region between the pixels.

According to one embodiment of the present invention, the pressure sensing touch screen further comprises a touch control circuit electrically connected to the sensing electrodes and the driving electrodes via at least one second lead.

According to one embodiment of the present invention, a width of the touch sensing layer disposed corresponding to the gap region between the pixels is less than a width of the pressure sensing layer disposed corresponding to the gap region between the pixels.

According to one embodiment of the present invention, the pressure sensing layer is made of an opaque piezoelectric material, and the opaque piezoelectric material comprises an opaque composite polymer material and an opaque metal material.

According to one embodiment of the present invention, the pressure sensing layer is made of a light-transmissive electrically-conductive material or an opaque electrically-conductive material.

The present invention further provides an input device, comprising the pressure sensing touch screen in the above-mentioned embodiment.

The present invention also has the following advantages. The touch sensing layer can be made of different materials. For example, when the touch sensing layer is made of an opaque metal material, the touch sensing layer can form a mesh-form touch sensing pattern which goes around the light-emitting pixels to thereby prevent affecting illumination of the display panel. When the touch sensing layer is made of light-transmissive indium tin oxide (ITO) or a material mixed with ITO, the first insulating layer may be a thin film substrate and attached to the pressure sensing layer with an optically clear adhesive. Therefore, a lighter and thinner touch screen device can be made quickly and with ease.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

References to "embodiments" in below detailed description mean that the specific features, structures or characteristics described in connection with the embodiments may be included in at least one embodiment of the invention. The same terms appearing in different places in the specification are not necessarily limited to the same embodiment, but should be understood as independent or alternative embodiments to other embodiments. In view of the technical solutions disclosed in the embodiments of the present invention, those skilled in the art should understand that the embodiments described herein may have other variations or modifications in accordance with the embodiments of the present invention.

Figure 1:
FIG. 1 is a schematic cross-sectional view illustrating the present invention according to a first embodiment.

Please refer to FIG. 1 which is a cross-sectional view according to the first embodiment of the present invention. As shown in the drawing, the present invention provides a pressure sensing touch screen. The pressure sensing touch screen comprises a display panel 1, a pressure sensing layer 2, and a touch sensing layer 4.

Figure 2:
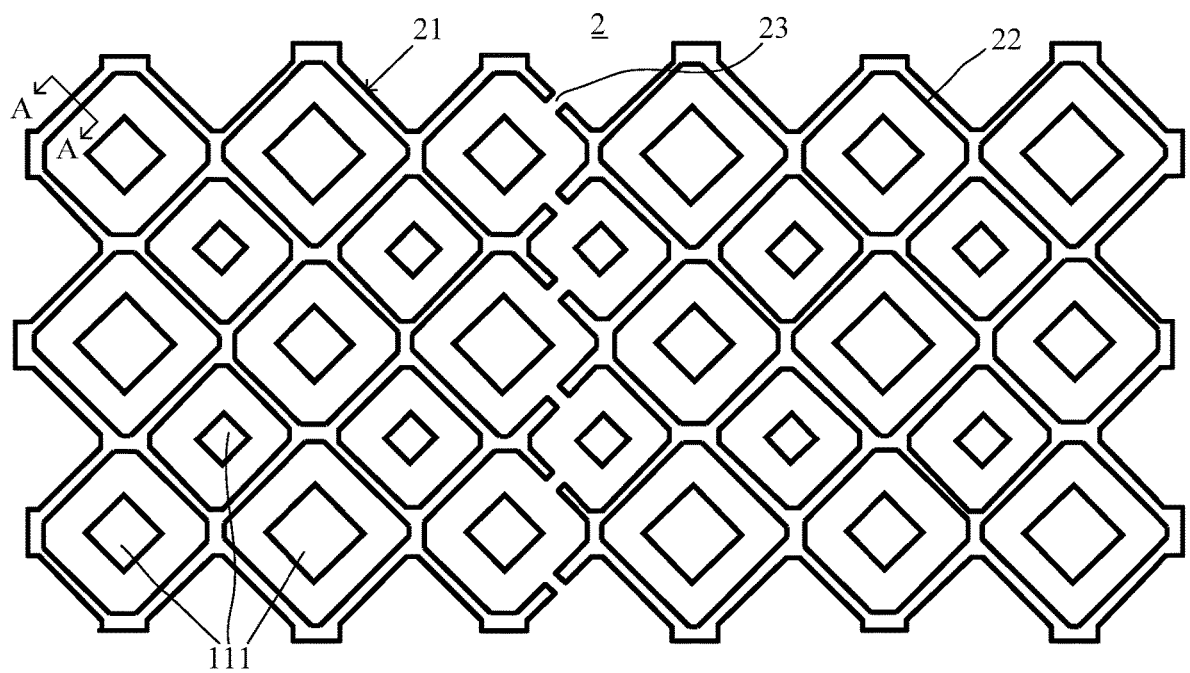
FIG. 2 is a schematic view illustrating a pressure sensing layer according to the first embodiment of the present invention.
Figure 3:
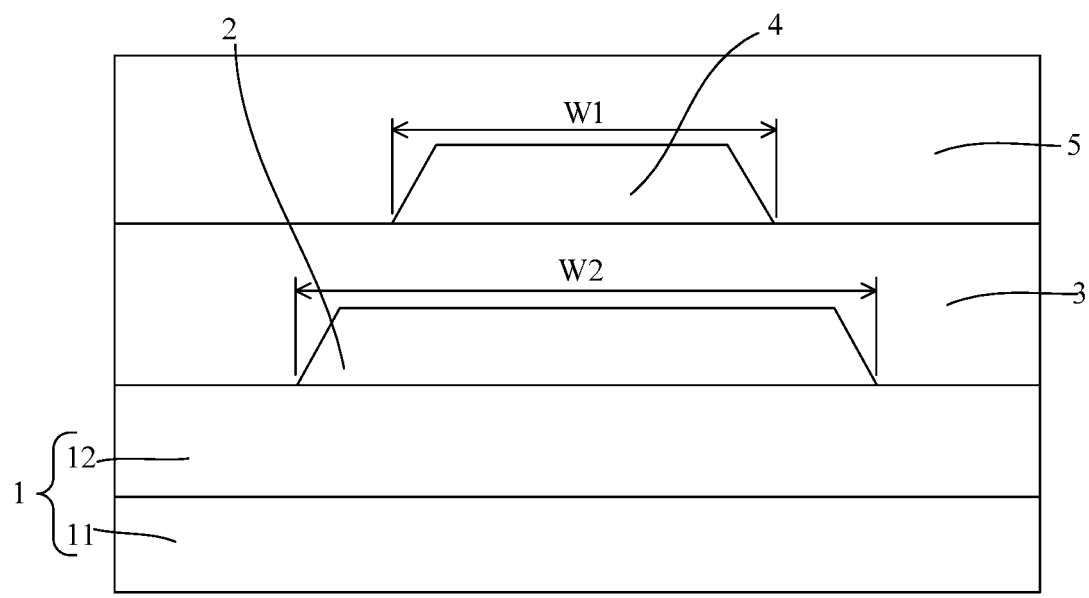
FIG. 3 is a schematic cross-sectional view taken along line A-A of FIG. 2.
Figure 4:
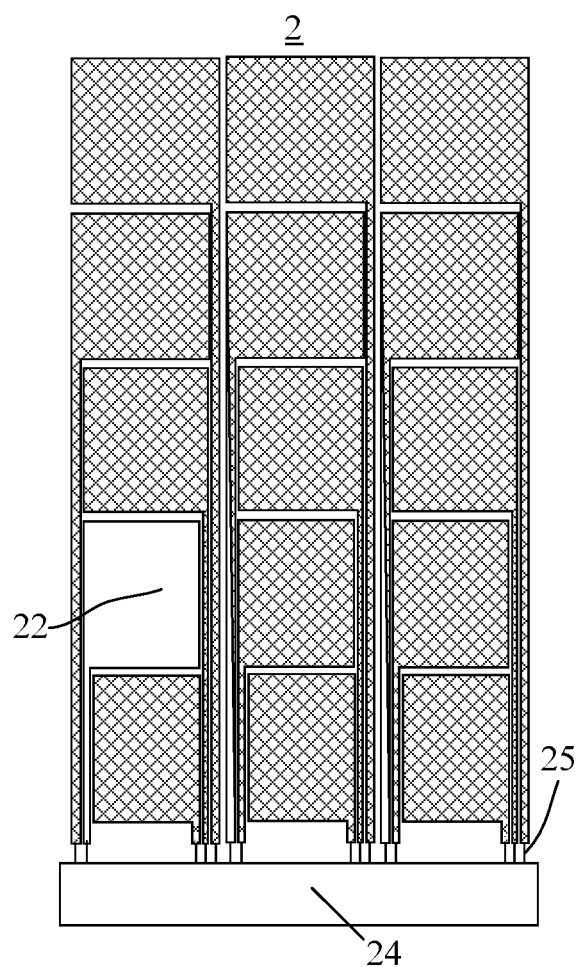
FIG. 4 is another schematic view illustrating the pressure sensing layer according to the first embodiment of the present invention.

Please also refer to FIGS. 2, 3, and 4. The display panel 1 comprises a plurality of pixels 111 arranged in an array. The display panel 1 also comprises an organic light emitting layer 11 and an encapsulation layer 12 disposed on the organic light emitting layer 11. The pressure sensing layer 2 is disposed on a side surface 13 of the display panel 1. The side surface 13 is preferably a front side. The pixels 111 are arrayed in the organic light emitting layer 11. The pressure sensing layer 2 is disposed on the encapsulation layer 12. The pressure sensing layer 2 comprises at least one pressure sensing grid 22. The at least one pressure sensing grid 22 is disposed corresponding to a gap region between the pixels 111. Each pressure sensing grid 22 is constituted by, for example, metal lines 21.

The touch sensing layer 4 is disposed on the pressure sensing layer 2. The touch sensing layer 4 comprises a plurality of sensing electrodes 41 arranged along a first direction X and a plurality of driving electrodes 42 arranged along a second direction Y. It is preferable that the first direction X is perpendicular to the second direction Y; however, the first direction X and the second direction Y may also intersect at another intersection angle, and the intersection angle is not limited herein. The sensing electrodes 41 and the driving electrodes 42 together form a touch sensing pattern 43. The touch sensing pattern 43 is a mutual capacitive touch control sensing capacitor. A first insulating layer 3 is interposed between the pressure sensing layer 2 and the touch sensing layer 4. The first insulating layer 3 can avoid mutual interference between the pressure sensing layer 2 and the touch sensing layer 4, thereby facilitating feeding back touch pressure and touch positions.

The pressure sensing layer 2 further comprises a plurality of openings 23 defined in the metal lines 22 and a pressure sensing control circuit 24. The pressure sensing control circuit 24 is electrically connected to the at least one pressure sensing grid 22 via at least one first lead 25. In the present embodiment, there are preferably multiple first leads 25. The pressure sensing control circuit 24 comprises a voltage amplifier or a charge amplifier (not illustrated). When the pressure sensing layer 2 is subjected to a change in touch pressure, a voltage change or a change of the number of electric charges is detected, so a touch position and the magnitude of the touch pressure are determined.

In the embodiment shown in FIG. 3, a width W1 of the touch sensing layer 4 disposed corresponding to the gap region between the pixels 111 is less than a width W2 of the pressure sensing layer 2 disposed corresponding to the gap region between the pixels 111. To be specific, the width W1 of metal lines of the touch sensing layer 4 is less than the width W2 of the metal lines of the pressure sensing layer 2. This configuration ensures that the pressure sensing layer 2 feeds back signals to the touch sensing layer 4. In the first embodiment, a second insulating layer 5 is disposed on the touch sensing layer 4. The second insulating layer 5 is, for example, a glass plate or a light transmissive film to protect the touch sensing layer 4 from damage or entry of moisture.

In the embodiment shown in FIG. 4, each pressure sensing grid 22 is, but not limited to, a rectangular shape. Each of the pressure sensing grids 22 has a side length of 4 to 6 millimeters (mm). The touch sensing layer 4 is made of a light-transmissive conductive material or an opaque conductive material. In the present embodiment, the touch sensing layer 4 is preferably made of an opaque metal material like gold, silver, copper, lithium, sodium, potassium, magnesium, titanium, aluminum, zinc, or a combination thereof. However, in a second embodiment shown in FIG. 6, the touch sensing layer 4 may also be made of a light-transmissive conductive material, and the light-transmissive conductive material is preferably indium tin oxide (ITO). In alternative embodiments, the light transmissive conductive material may also be indium tin oxide mixed with aluminum zinc oxide, antimony tin oxide, and a combination thereof; the material may vary as required.

Figure 5:
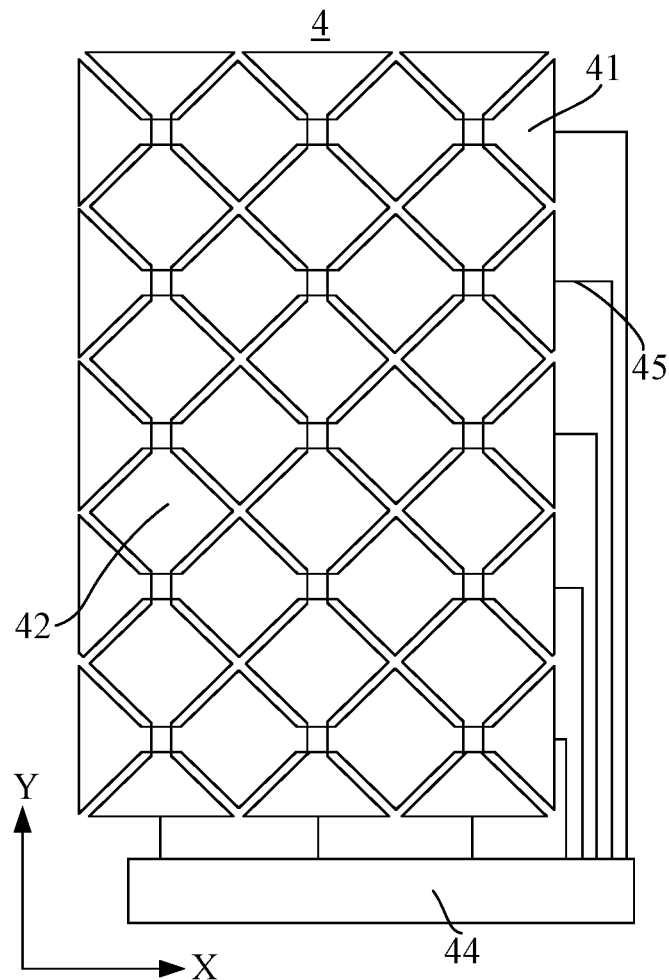
FIG. 5 is a schematic view illustrating a touch sensing layer according to the first embodiment of the present invention.

Referring to FIG. 5, the touch sensing layer 4 further comprises a touch control circuit 44 and at least one second lead 45 connected to the sensing electrodes 41 and the driving electrodes 42. In the present embodiment, the touch sensing layer 4 preferably has multiple second leads 45. The touch control circuit 44 is disposed corresponding to the pressure sensing control circuit 24. The touch control circuit 44 protrudes out of the display panel 1.

The pressure sensing layer 2 is made of an opaque piezoelectric material, and the opaque piezoelectric material comprises an opaque composite polymer material and an opaque metal material. In the first embodiment, the opaque composite polymer material is preferably polyvinylidene fluoride (PVDF). In alternative embodiments, the opaque composite polymer material may also be polyvinylidene fluoride, nylon, polyvinyl chloride, polymethyl methacrylate (PMMA), polypropylene, or lead zirconate titanate ceramic (PZT). The opaque metal material is a material selected from titanium, aluminum, zinc and a combination thereof.

Figure 6:
FIG. 6 is a schematic cross-sectional view illustrating the present invention according to a second embodiment.

As shown in FIG. 6, when the touch sensing layer 4 is made of ITO, the first insulating layer 3 is a thin film substrate 31. The touch sensing layer 4 is attached to the pressure sensing layer 2 by an optically clear adhesive applied to one side of the thin film substrate 31, thereby facilitating feeding back touch pressure and touch positions.

When a finger touches the pressure sensing touch screen, the pressure sensing layer 2 feeds back the pressure of the finger, and the touch sensing layer 4 accurately feeds back touch positions of the finger. Therefore, by combining the feedback signals from the pressure sensing layer 2 and the touch sensing layer 4, the pressure sensing touch screen can obtain the magnitude of the pressure of the finger and its precise touch position. In short, by means of the piezoelectric material (i.e., the pressure sensing layer 2) placed on the side surface 13 (i.e., the front surface) of the display panel 1, and also by using the touch sensing layer 4 in combination with the pressure sensing layer 2, pressure and touch positions can be detected, and thereby devices can be made lighter and thinner in an integral form.

The present invention also provides an input device comprising the pressure sensing touch screen of the above-mentioned embodiments. The input device is, for example, an active-matrix organic light-emitting diode (AMOLED) touch display device, a mobile phone, a tablet computer or other suitable electronic device. The structure of the pressure sensing touch screen of the input device is mentioned in the above embodiments, so a detailed description is not repeated herein for brevity.

The present invention can use the touch sensing layer 4 of different materials. For example, when the touch sensing layer 4 is made of an opaque metal material, the touch sensing layer 4 can form a mesh-shaped touch sensing pattern 21 which goes around the light-emitting pixels 111 to thereby prevent affecting illumination of the display panel 1. When the touch sensing layer 4 is made of light-transmissive Indium-tin oxide (ITO) or a material mixed with ITO, the first insulating layer 3 may be a thin film substrate 31 and attached to the pressure sensing layer 2 with the optically clear adhesive 31. Therefore, a lighter and thinner touch screen device can be made quickly and with ease.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A pressure sensing touch screen, comprising:
    a display panel comprising a plurality of pixels;
    a pressure sensing layer disposed on the display panel and arranged corresponding to a gap region between the pixels; and
    a touch sensing layer disposed on the pressure sensing layer, a first insulating layer being interposed between the pressure sensing layer and the touch sensing layer;
    wherein the pressure sensing layer comprises at least one pressure sensing grid, and the at least one pressure sensing grid is disposed corresponding to the gap region between the pixels.

2. The pressure sensing touch screen according to claim 1, further comprising a pressure sensing control circuit electrically connected to the at least one pressure sensing grid via at least one first lead.

3. The pressure sensing touch screen according to claim 1, wherein the touch sensing layer comprises a plurality of sensing electrodes arranged along a first direction and a plurality of driving electrodes arranged along a second direction, and each of the sensing electrodes and a corresponding one of the driving electrodes together form a mutual capacitive touch control sensing capacitance.

4. The pressure sensing touch screen according to claim 3, wherein the touch sensing layer is disposed corresponding to a gap region between the pixels, and the sensing electrodes and the driving electrodes are disposed corresponding to a gap region between the pixels.

5. The pressure sensing touch screen according to claim 4, further comprising a touch control circuit electrically connected to the sensing electrodes and the driving electrodes via at least one second lead.

6. The pressure sensing touch screen according to claim 4, wherein a width of the touch sensing layer disposed corresponding to the gap region between the pixels is less than a width of the pressure sensing layer disposed corresponding to the gap region between the pixels.

7. The pressure sensing touch screen according to claim 1, wherein the pressure sensing layer is made of an opaque piezoelectric material, and the opaque piezoelectric material comprises an opaque composite polymer material and an opaque metal material.

8. The pressure sensing touch screen according to claim 1, wherein the touch sensing layer is made of a light-transmissive electrically-conductive material or an opaque electrically-conductive material.

9. A pressure sensing touch screen, comprising:
    a display panel comprising a plurality of pixels;
    a pressure sensing layer disposed on the display panel and arranged corresponding to a gap region between the pixels; and
    a touch sensing layer disposed on the pressure sensing layer, a first insulating layer being interposed between the pressure sensing layer and the touch sensing layer.

10. The pressure sensing touch screen according to claim 9, wherein the pressure sensing layer comprises at least one pressure sensing grid, and the at least one pressure sensing grid is disposed corresponding to the gap region between the pixels.

11. The pressure sensing touch screen according to claim 10, further comprising a pressure sensing control circuit, the pressure sensing control circuit being electrically connected to the at least one pressure sensing grid via at least one first lead.

12. The pressure sensing touch screen according to claim 9, wherein the touch sensing layer comprises a plurality of sensing electrodes arranged in a first direction and a plurality of driving electrodes arranged in a second direction, and each of the sensing electrodes and a corresponding one of the driving electrodes together form a mutual capacitive touch control sensing capacitance.

13. The pressure sensing touch screen according to claim 12, wherein the touch sensing layer is disposed corresponding to a gap region between the pixels, and the sensing electrodes and the driving electrodes are disposed corresponding to a gap region between the pixels.

14. The pressure sensing touch screen according to claim 13, further comprising a touch control circuit, the touch control circuit being electrically connected to the sensing electrodes and the driving electrodes via at least one second lead.

15. The pressure sensing touch screen according to claim 13, wherein a width of the touch sensing layer disposed corresponding to the gap region between the pixels is less than a width of the pressure sensing layer disposed corresponding to the gap region between the pixels.

16. The pressure sensing touch screen according to claim 9, wherein the pressure sensing layer is made of an opaque piezoelectric material, and the opaque piezoelectric material comprises an opaque composite polymer material and an opaque metal material.

17. The pressure sensing touch screen according to claim 9, wherein the pressure sensing layer is made of a light-transmissive electrically-conductive material or an opaque electrically-conductive material.

18. An input device, comprising the pressure sensing touch screen of claim 9.

\* \* \* \* \*